United States Patent

Groh

(10) Patent No.: US 11,995,553 B2
(45) Date of Patent: May 28, 2024

(54) PARAMETERIZATION OF A MACHINE LEARNING SYSTEM FOR A CONTROL SYSTEM

(71) Applicant: Robert Bosch GmbH, Stuttgart (DE)

(72) Inventor: Konrad Groh, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 709 days.

(21) Appl. No.: 17/252,524

(22) PCT Filed: Aug. 13, 2019

(86) PCT No.: PCT/EP2019/071735
§ 371 (c)(1),
(2) Date: Dec. 15, 2020

(87) PCT Pub. No.: WO2020/057868
PCT Pub. Date: Mar. 26, 2020

(65) Prior Publication Data
US 2021/0271972 A1    Sep. 2, 2021

(30) Foreign Application Priority Data

Sep. 20, 2018    (DE) .................. 102018216078.3

(51) Int. Cl.
*G06N 3/08* (2023.01)
*G06F 18/211* (2023.01)
(Continued)

(52) U.S. Cl.
CPC .......... *G06N 3/082* (2013.01); *G06F 18/211* (2023.01); *G06F 18/214* (2023.01);
(Continued)

(58) Field of Classification Search
CPC ........ G06N 3/08; G06N 3/082; G06F 18/214; G06F 18/2431
See application file for complete search history.

(56) References Cited

U.S. PATENT DOCUMENTS

2020/0125852 A1*   4/2020   Carreira ................. G06N 3/049

FOREIGN PATENT DOCUMENTS

DE    202017102238 U1    5/2017
DE    202018104373 U1    8/2018

OTHER PUBLICATIONS

Liu, Xin, et al. "Self-error-correcting convolutional neural network for learning with noisy labels." 2017 12th IEEE International Conference on Automatic Face & Gesture Recognition (FG 2017). IEEE, 2017. (Year: 2017).*

(Continued)

*Primary Examiner* — Hal Schnee
(74) *Attorney, Agent, or Firm* — NORTON ROSE FULBRIGHT US LLP; Gerard A. Messina (57) ABSTRACT

A method for parameterizing a machine learning system, in particular a neural network, that is configured to ascertain in each case an associated class of a plurality of classes from input data. The machine learning system is trained once with correctly labeled training data, and once with not correctly labeled training data. Hyperparameters of the machine learning system are selected in such a way that the particular trained machine learning system may reproduce actual classifications of the correctly labeled training data better than actual classifications of the not correctly labeled training data.

14 Claims, 11 Drawing Sheets

(51) Int. Cl.
G06F 18/214 (2023.01)
G06F 18/241 (2023.01)
G06F 18/2431 (2023.01)
G06N 3/082 (2023.01)

(52) U.S. Cl.
CPC ........ *G06F 18/241* (2023.01); *G06F 18/2431* (2023.01); *G06N 3/08* (2013.01)

(56) References Cited

OTHER PUBLICATIONS

Bartlett, Peter L., Dylan J. Foster, and Matus J. Telgarsky. "Spectrally-normalized margin bounds for neural networks." Advances in neural information processing systems 30 (2017). (Year: 2017).*

Arpit, et al.: "A Closer Look at Memorization in Deep Networks", Proceedings of the 34th International Conference on Machine Learning (PMLR 70, 2017), Australia, pp. 1-10, https://arxiv.org/abs/1706.05394v2.

Bartlett, et al.: "Spectrally-normalized margin bounds for neural networks", arXiv e-prints, (2017), pp. 1-24, https://arxiv.org/abs/1706.08498v2.

Elsayed, et al.: "Large Margin Deep Networks for Classification", arXiv e-prints, (2018), pp. 1-25, https://arxiv.org/abs/1803.05598v1.

Zhang, et al.: "Understanding deep learning requires re-thinking generalization", arXiv e-prints, (2017), pp. 1-15, https://arxiv.org/abs/1611.03530v2.

International Search Report for PCT/EP2019/071735, Issued Nov. 14, 2019.

David Rolnick et al., "Deep Learning is Robust to Massive Label Noise," Cornell University Library, 2018, pp. 1-10. ARXIV:1705.10694V3; Downloaded Nov. 30, 2020.

* cited by examiner

PARAMETERIZATION OF A MACHINE LEARNING SYSTEM FOR A CONTROL SYSTEM

FIELD

The present invention relates to a method for parameterizing a machine learning system, a training system, a control system, a method for operating the control system, a computer program, and a machine-readable memory medium.

BACKGROUND INFORMATION

A method for training a machine learning system is described in German Patent Application No. DE 20 2017 102 238 U, in which parameters of the machine learning system are trained with observation values and associated desired first output values, using a training set for the machine learning system.

SUMMARY

In the following discussion, reference symbol X refers to the input space and Y refers to the output space (target space). A training data set $S=((x_1,y_1), \ldots, (x_m,y_m))$ is provided. The data are extracted from a fixed, unknown distribution P over (X, Y). In addition, a loss function $l:Y\times Y\to R$ is provided. For a function $f:X\to Y$, the expected loss is defined by $R[f]:=\mathbb{E}_{x,y\sim p}l(f(x),y)$. The empirical risk is defined by $$\hat{R}_S[f] := \frac{1}{m}\sum_{i=1}^m l(f(x_i), y_i).$$

This variable is also referred to below as parameter $\mathcal{L}$.

The task of a machine learning method is to learn a function $f:X\to Y$ from a function class F that minimizes expected loss $R[f]$. Since this is generally not possible, this task is replaced by the task of learning, based on a training data set S, a function $f_S:X\to Y$ from a function class F that minimizes the empirical (expected) risk.

If a function $f_s$ has been obtained in this way, a key issue is how well $f_s$ generalizes for new data points $(x, y)\sim P$. This is characterized by difference $R[f_S]-\hat{R}_S[f_S]$.

A machine learning system, for example a neural network, may be described using a plurality of parameters. These parameters may be subdivided into architecture parameters, such as the depth, the number and form of the filters, and the selection of the nonlinearities and links; and optimization parameters, such as the increment, the size of the batches, and the number of iterations. In other words, architecture parameters characterize function $f$, whereas optimization parameters characterize the optimization method that is used during the training.

The selection of these parameters may be based, for example, on empirical knowledge or the performance of the neural network on a validation data set. Since a neural network is generally parameterized by many more parameters than the number of provided data points, there is a risk that the network memorizes the training data. A network trained in this way may possibly not be well suited for use in security-critical functions, for example for automated driving, since the task may not be well controllable for new data points.

SUMMARY

A method in accordance with an example embodiment of the present invention prevents a machine learning system from memorizing the training data during the training; i.e., architecture parameters and/or optimization parameters may be automatedly determined by a parameter search. As a result of the architecture parameters and/or optimization parameters determined in this way, the machine learning system may generalize in an improved manner.

SUMMARY

In a first aspect, the present invention relates to a method for computer-assisted parameterization of a machine learning system. Further aspects of the present invention are described herein. Advantageous refinements of the present invention are described herein.

Machine learning systems, in particular artificial neural networks, are considered. To carry out a classification task, i.e., the association of input signals x of an input space $X=\mathbb{R}^d$ with a class y made up of a number k of many classes. This association takes place, for example, with the aid of a function $f:\mathbb{R}^d\to\mathbb{R}^k$, where $\mathbb{R}^k$ is a Euclidean space. The components of $f(x)$ correspond in each case to one of the classes, and in each case characterize a likelihood that associated class y is a correct classification of input signal x. An argmax function may be used to associate input signal x with a certain class. The argmax function outputs the coordinate of the maximum value of $f$; i.e., $y=N(x)=\arg\max f(x)$.

Training data include a plurality of training points $(x_T,y_T)$ which are pairs of an example of input data $x_T$ and an associated classification $y_T$. If classification $N(x_T)$ of the machine learning system is correct, the value of the i-th coordinate of $f(x_T)$ is the largest of the values. This means that $f(x_T)_i > f(x_T)_j$ for all $j\neq i$.

A margin m is defined by $$m = f(x_T)_i - \max_{j\neq i} f(x_T)_j.$$

If the margin is positive, the classification is correct; if the margin is negative, the classification is incorrect.

Figure 11:
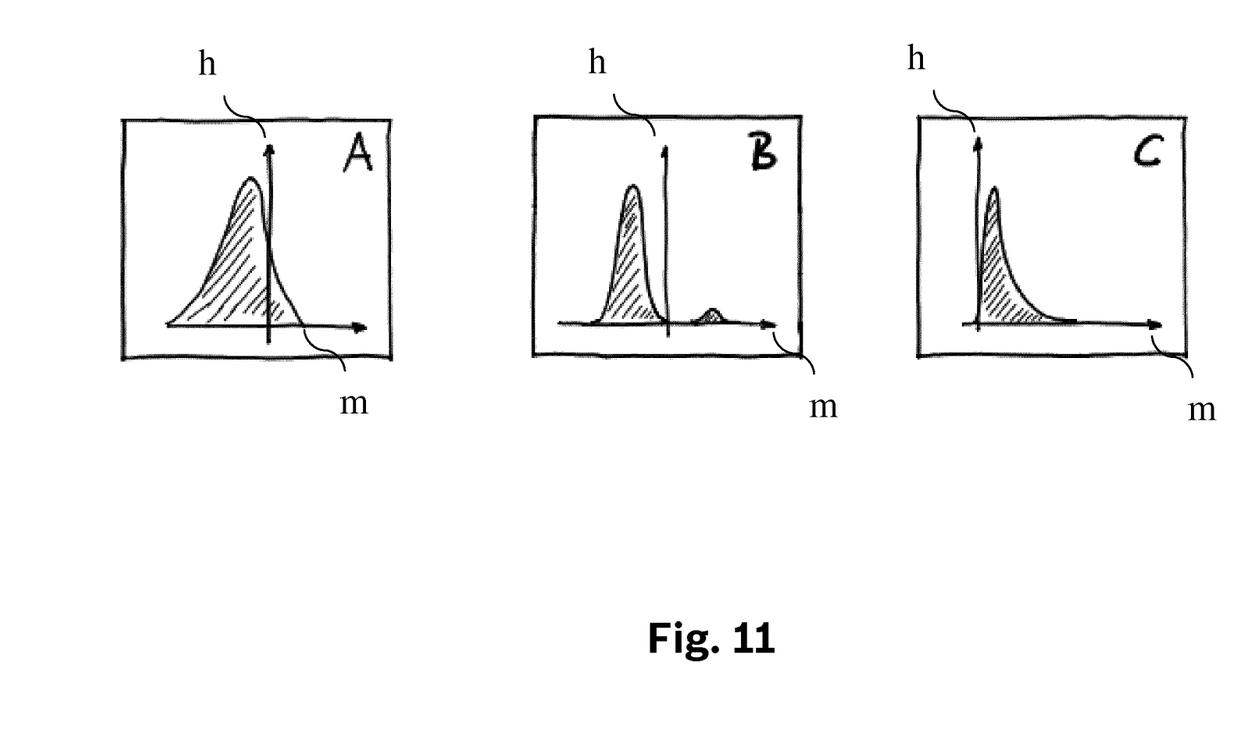
FIG. 11 shows an example of statistical distributions of margins.

The present invention is based on the observation that the histograms of the margins of training data follow different distributions, depending on whether or not the machine learning system has correctly learned the underlying structure of the relationship between input data $x_T$ and classification $y_T$. FIG. 11 shows an example of such distributions. Margin m is plotted in each case on the abscissa, and frequency h is plotted on the ordinate.

Training a machine learning system using training data $(x_T,y_T)$ results in a distribution as illustrated in FIG. 11A or FIG. 11B when it has not been possible to correctly learn the association of input data $x_T$ and classification $y_T$, and results in a distribution as illustrated in FIG. 11C when it has been possible to correctly learn the association of input data $x_T$ and classification $y_T$. Which of the distributions results depends on hyperparameters (denoted below by reference symbol $\theta_H$).

Hyperparameters $\theta_H$ may be characterized in that they remain unchanged during the training of the machine learning system. Hyperparameters $\theta_H$ may include architecture parameters $\theta_A$ and/or optimization parameters $\theta_O$, for example.

Architecture parameters $\theta_A$ characterize the structure of the machine learning system. If the machine learning system is a neural network, architecture parameters $\theta_A$ include, for example, a depth (i.e., number of layers) of the neural network and/or the number of filters and/or parameters that characterize the form of the filters, and/or parameters that characterize the nonlinearities of the neural network, and/or parameters that characterize which layers of the neural network are connected to which other layers of the neural network.

Optimization parameters $\theta_O$ are parameters that characterize the behavior of an optimization algorithm for adapting parameters $\theta$ that are adapted during the training. For example, these parameters may include a numerical increment and/or a size of data batches and/or a minimum or maximum number of iterations.

Varying degrees of learning success of the training of the machine learning system result for different values of hyperparameters $\theta_H$. To preferably optimize the generalization of the machine learning system, it has been found that hyperparameters $\theta_H$ are to be selected in such a way that a correctly labeled data set $X_C=(x_T,y_T)$ may be satisfactorily learned; i.e., a distribution of margins m similar to that shown in FIG. 11 (C) results, whereas for an incorrectly, in particular randomized, labeled data set $X_r=(x_T,\hat{y}_T)$ whose classes $\hat{y}_T$ are changed with respect to correctly labeled data set $X_C$, in particular permutated in the sequence, a distribution of margins m similar to that shown in FIG. 11 (A) or FIG. 11 (B) results. Hyperparameters $\theta_H$, which include, for example, a regularization parameter, in particular an $l_1$ regularization parameter $\lambda$, are preferably selected in particular to be large enough that the distribution of margins m, as shown in FIG. 11 (B), has a second maximum as a function of the margins (i.e., the regularization parameter is selected to be large enough that the distribution has a second maximum, but not for a regularization parameter that is selected to be smaller).

Specific embodiments of the present invention are explained in greater detail below with reference to the figures.

DETAILED DESCRIPTION OF EXAMPLE EMBODIMENTS

Figure 1:
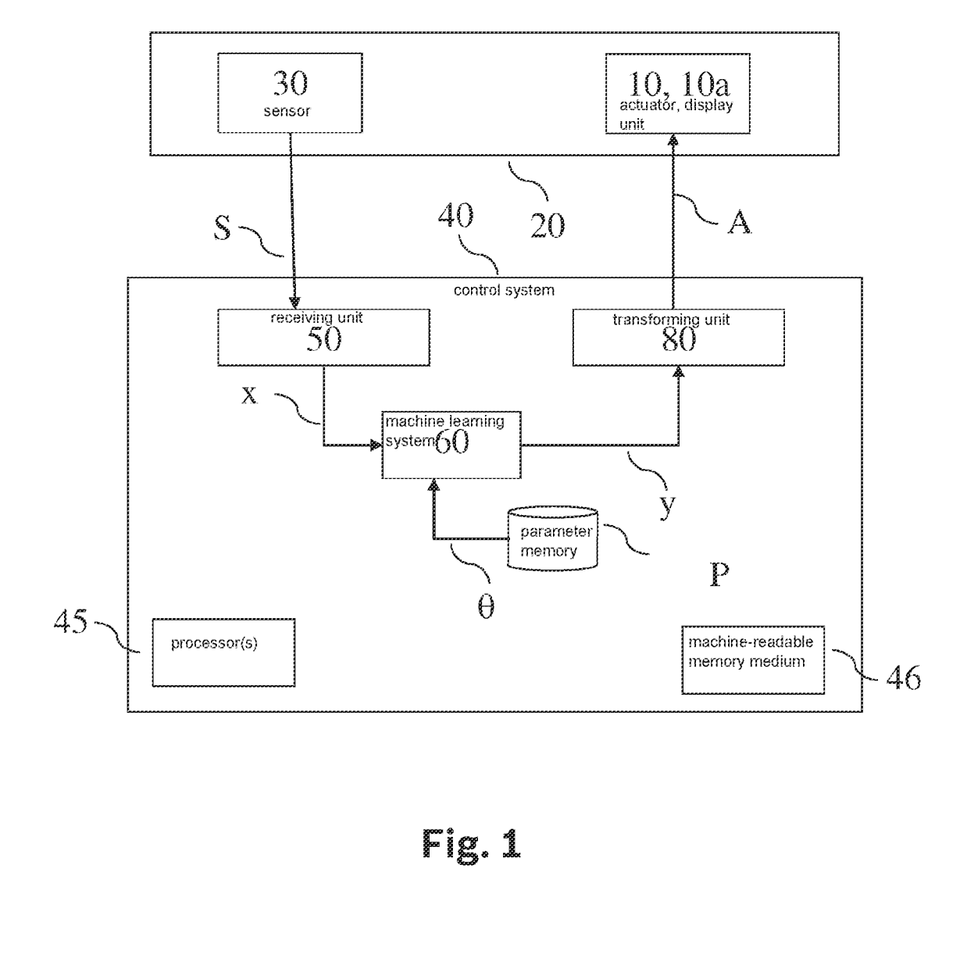
FIG. 1 schematically shows a design of one specific embodiment of the present invention.

FIG. 1 shows an actuator 10 in its surroundings 20 in interaction with a control system 40. Actuator 10 and surroundings 20 are also referred to collectively as an actuator system. At preferably regular time intervals a state of the actuator system is detected with a sensor 30, which may also be provided by a plurality of sensors. Sensor signal S, or in the case of multiple sensors, one sensor signal S each, of sensor 30 is transmitted to control system 40. Control system 40 thus receives a sequence of sensor signals S. Control system 40 ascertains therefrom control signals A, which are transmitted to actuator 10.

Control system 40 receives the sequence of sensor signals S of sensor 30 in an optional receiving unit 50, which converts the sequence of sensor signals S into a sequence of input signals x (alternatively, each sensor signal S may also be directly accepted as an input signal x). Input signal x may, for example, be a section or a further processing of sensor signal S. Input signal x may include, for example, image data or images, or individual frames of a video recording. In other words, input signal x is ascertained as a function of sensor signal S. Input signal x is supplied to a machine learning system 60, which is a neural network, for example.

Machine learning system 60 is preferably parameterized by parameters $\theta$, which are stored in a parameter memory P and provided by same.

Machine learning system 60 ascertains output signals y from input signals x. Output signals y are supplied to an optional transforming unit 80, which ascertains therefrom control signals A that are supplied to actuator 10 in order to appropriately control actuator 10.

Actuator 10 receives control signals A, is appropriately controlled, and carries out a corresponding action. Actuator 10 may include a control logic system (not necessarily structurally integrated) which ascertains from control signal A a second control signal with which actuator 10 is then controlled.

In further specific embodiments, control system 40 includes sensor 30. In yet further specific embodiments, control system alternatively or additionally controls actuator 10.

In further preferred specific embodiments, control system 40 includes one or multiple processors 45 and at least one machine-readable memory medium 46 on which instructions are stored, which, when executed on processors 45, prompt control system 40 to carry out the method according the present invention.

In alternative specific embodiments, a display unit 10a is provided as an alternative to or in addition to actuator 10.

Figure 2:
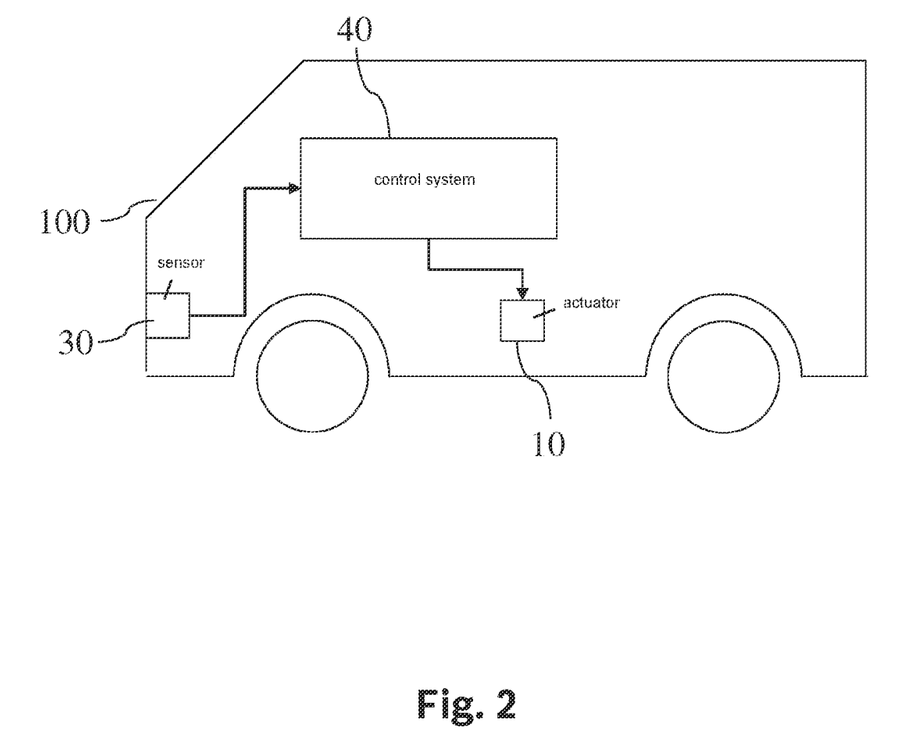
FIG. 2 schematically shows one exemplary embodiment for controlling an at least semi-autonomous robot, in accordance with the present invention.

FIG. 2 shows one exemplary embodiment in which control system is used for controlling an at least semi-autonomous robot, in the present case an at least semi-autonomous motor vehicle 100.

Sensor 30 may be, for example, one or multiple video sensors and/or one or multiple radar sensors and/or one or multiple ultrasonic sensors and/or one or multiple LIDAR sensors and/or one or multiple position sensors (GPS, for example), preferably situated in motor vehicle 100. Alternatively or additionally, sensor 30 may include an information system that ascertains a piece of information concerning a state of the actuator system, for example a weather information system that ascertains an instantaneous or future state of the weather in surroundings 20.

Based on input data x, machine learning system 60 may detect, for example, objects in the surroundings of the at least semi-autonomous robot. Output signal y may be a piece of information that characterizes where in the surroundings of the at least semi-autonomous robot objects are present. Output signal A may then be ascertained as a function of this information and/or corresponding to this information.

Actuator 10, which is preferably situated in motor vehicle 100, may be, for example, a brake, a drive, or a steering system of motor vehicle 100. Control signal A may then be ascertained in such a way that actuator or actuators 10 is/are controlled in such a way that motor vehicle 100 for example prevents a collision with the objects identified by machine learning system 60, in particular when objects of certain classes, for example pedestrians, are involved. In other words, control signal A may be ascertained as a function of the ascertained class and/or corresponding to the ascertained class.

Alternatively, the at least semi-autonomous robot may be some other mobile robot (not illustrated), for example one that moves by flying, swimming, diving, or stepping. The mobile robot may also be, for example, an at least semi-autonomous lawnmower or an at least semi-autonomous cleaning robot. In these cases as well, control signal A may be ascertained in such a way that the drive and/or steering system of the mobile robot are/is controlled in such a way that the at least semi-autonomous robot for example prevents a collision with the objects identified by machine learning system 60.

In a further alternative, the at least semi-autonomous robot may be a garden robot (not illustrated) that uses an imaging sensor and machine learning system 60 to ascertain a type or a state of plants in surroundings 20. Actuator 10 may then be an applicator of chemicals, for example. Control signal A may be ascertained, as a function of the ascertained type or the ascertained state of the plants, in such a way that a quantity of the chemicals is applied corresponding to the ascertained type or the ascertained state.

In yet further alternatives, the at least semi-autonomous robot may be a household appliance (not illustrated), in particular a washing machine, a stove, an oven, a microwave oven, or a dishwasher. By use of sensor 30, for example an optical sensor, a state of an object that is treated by the household appliance may be detected, for example in the case of the washing machine, a state of laundry situated in the washing machine. By use of machine learning system 60, a type or a state of this object may then be ascertained and characterized by output signal y. Control signal A may then be ascertained in such a way that the household appliance is controlled as a function of the ascertained type or the ascertained state of the object. For example, in the case of the washing machine, it may be controlled as a function of what material the laundry situated therein is made of. Control signal A may then be selected as a function of what material of the laundry has been ascertained.

Figure 3:
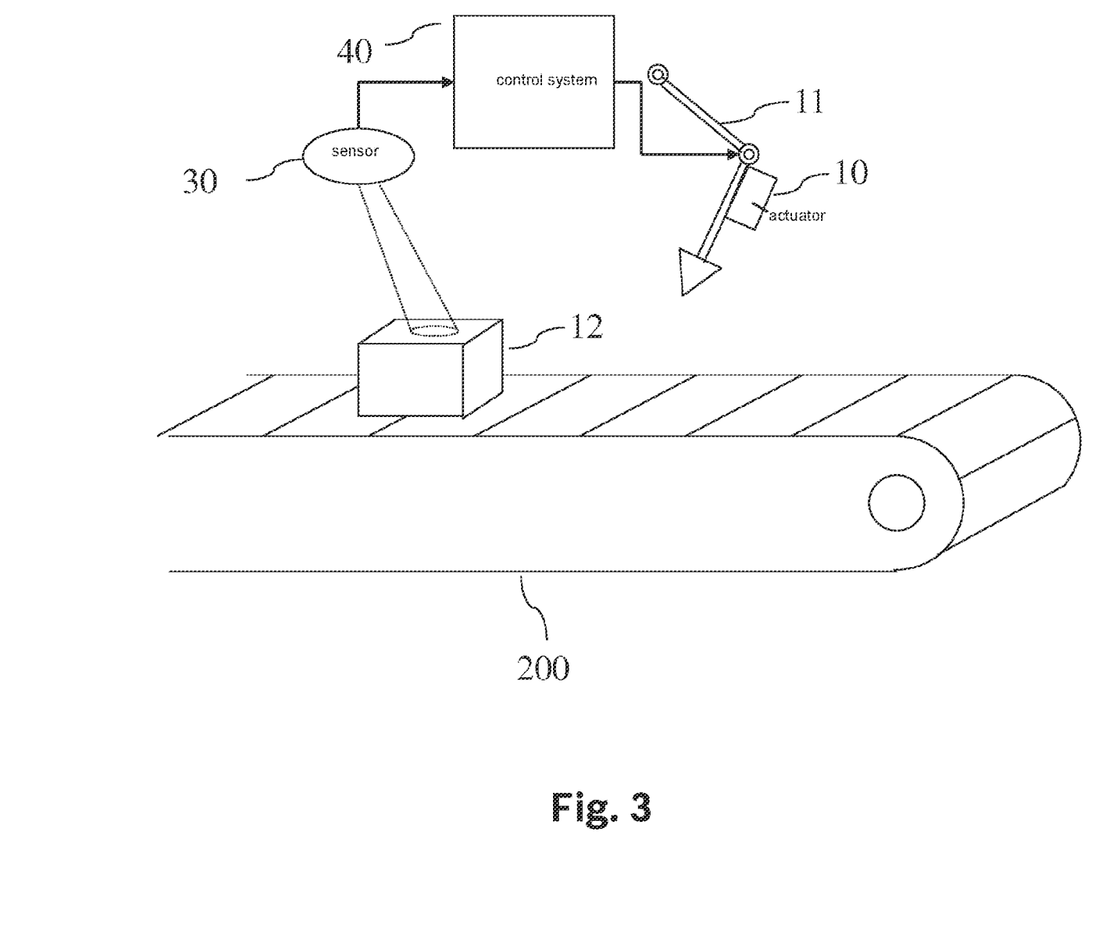
FIG. 3 schematically shows one exemplary embodiment for controlling a manufacturing system, in accordance with the present invention.

FIG. 3 shows one exemplary embodiment in which control system is used for controlling a manufacturing machine 11 of a manufacturing system 200 by actuating an actuator 10 that controls this manufacturing machine 11. Manufacturing machine 11 may be, for example, a machine for punching, sawing, drilling, and/or cutting.

Sensor 30 may then, for example, be an optical sensor that detects, for example, properties of manufactured products 12. It is possible for actuator 10, which controls manufacturing machine 11, to be actuated as a function of the ascertained properties of manufactured product 12, so that manufacturing machine 11 correspondingly carries out a subsequent processing step for this manufactured product 12. It is also possible for sensor 30 to ascertain the properties of manufactured product 12 that is processed by manufacturing machine 11, and as a function thereof to adapt a control of manufacturing machine 11 for a subsequent manufactured product.

Figure 4:
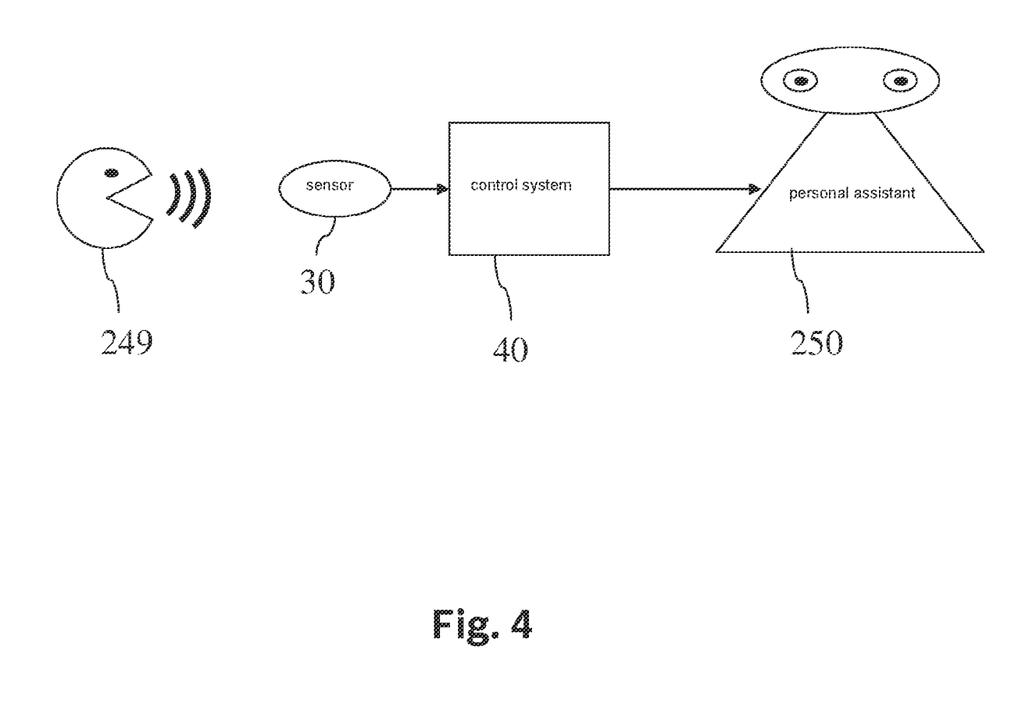
FIG. 4 schematically shows one exemplary embodiment for controlling a personal assistant, in accordance with the present invention.

FIG. 4 shows one exemplary embodiment in which control system is used for controlling a personal assistant 250. Sensor 30 is preferably an acoustic sensor that receives voice signals of a user 249. Alternatively or additionally, sensor 30 may be configured to receive optical signals, for example video images of a gesture by user 249.

Control system 40 ascertains a control signal A of personal assistant 250 as a function of the signals of sensor 30, for example by the machine learning system carrying out a gesture recognition. This ascertained control signal A is then transmitted to personal assistant 250, which is thus appropriately controlled. This ascertained control signal A may in particular be selected in such a way that it corresponds to a presumed desired control by user 249. This presumed desired control may be ascertained as a function of the gesture recognized by machine learning system 60. Control system 40 may then select control signal A for transmission to personal assistant 250 as a function of the presumed desired control, and/or select control signal A for transmission to the personal assistant, corresponding to presumed desired control 250 [sic].

This corresponding control may involve, for example, personal assistant 250 retrieving pieces of information from a database and reproduce them adoptable for user 249.

Instead of personal assistant 250, a household appliance (not illustrated), in particular a washing machine, a stove, an oven, a microwave oven, or a dishwasher, may be provided to be appropriately controlled.

Figure 5:
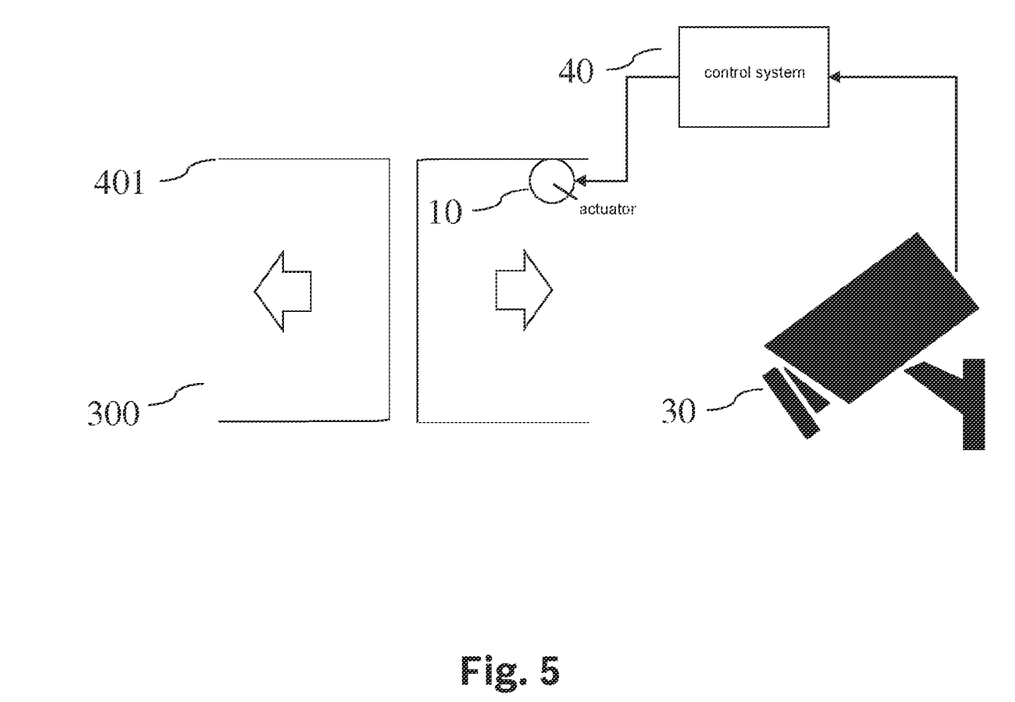
FIG. 5 schematically shows one exemplary embodiment for controlling an access system, in accordance with the present invention.

FIG. 5 shows one exemplary embodiment in which control system is used for controlling an access system 300. Access system 300 may include a physical access control, for example a door 401. Sensor 30 may be an optical sensor, for example (for example, for detecting image data or video data), that is configured to detect a face. This detected image may be interpreted with the aid of machine learning system 60. For example, the identity of a person may be ascertained. Actuator may be a lock that enables or does not enable the access control as a function of control signal A, for example opens or does not open door 401. For this purpose, control signal A may be selected as a function of the interpretation of machine learning system 60, for example as a function of the ascertained identity of the person. A logical access control may be provided instead of the physical access control.

Figure 6:
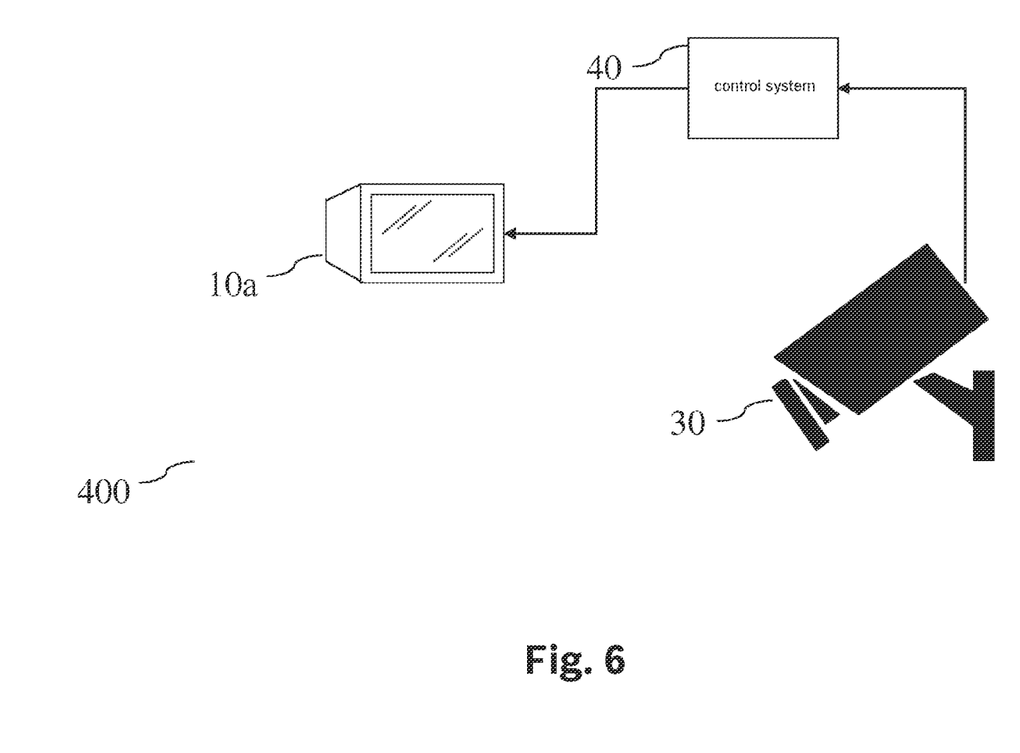
FIG. 6 schematically shows one exemplary embodiment for controlling a monitoring system, in accordance with the present invention.

FIG. 6 shows one exemplary embodiment in which control system is used for controlling a monitoring system 400. This exemplary embodiment differs from the exemplary embodiment illustrated in FIG. 5 in that display unit 10*a*, which is controlled by control system 40, is provided instead of actuator 10. For example, machine learning system 60 may ascertain whether an object recorded by the optical sensor is suspicious, and control signal A may then be selected in such a way that this object is depicted in a highlighted color by display unit 10*a*.

Figure 7:
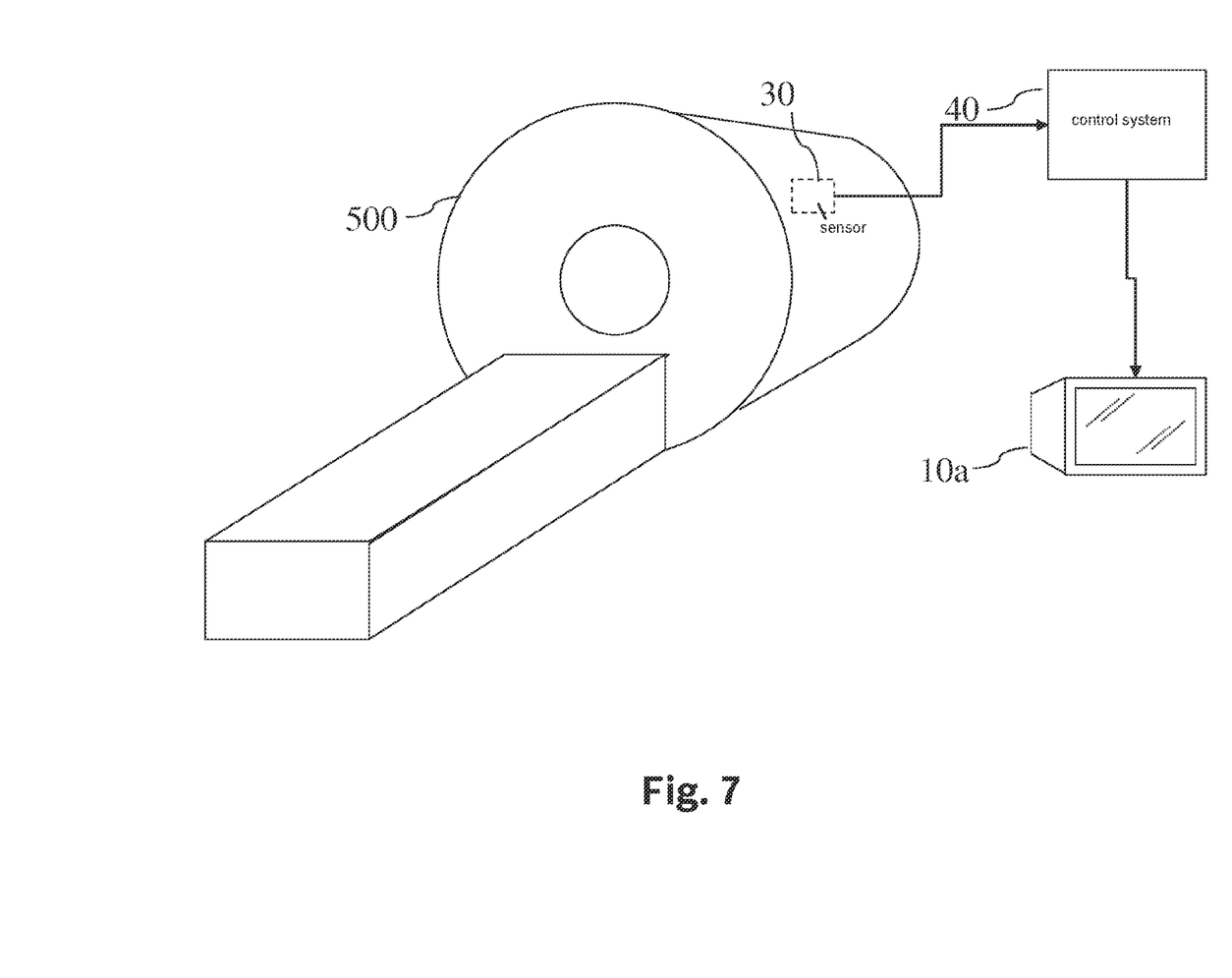
FIG. 7 schematically shows one exemplary embodiment for controlling a medical imaging system, in accordance with the present invention.

FIG. 7 shows one exemplary embodiment in which control system is used for controlling a medical imaging system 500, for example an MRI, X-ray, or ultrasound device. Sensor 30 may be provided, for example, by an imaging sensor, with display unit 10*a* controlled by control system 40. For example, machine learning system 60 may ascertain whether an area recorded by the imaging sensor is noteworthy, and control signal A may then be selected in such a way that this area is depicted in a highlighted color by display unit 10a.

Figure 8:
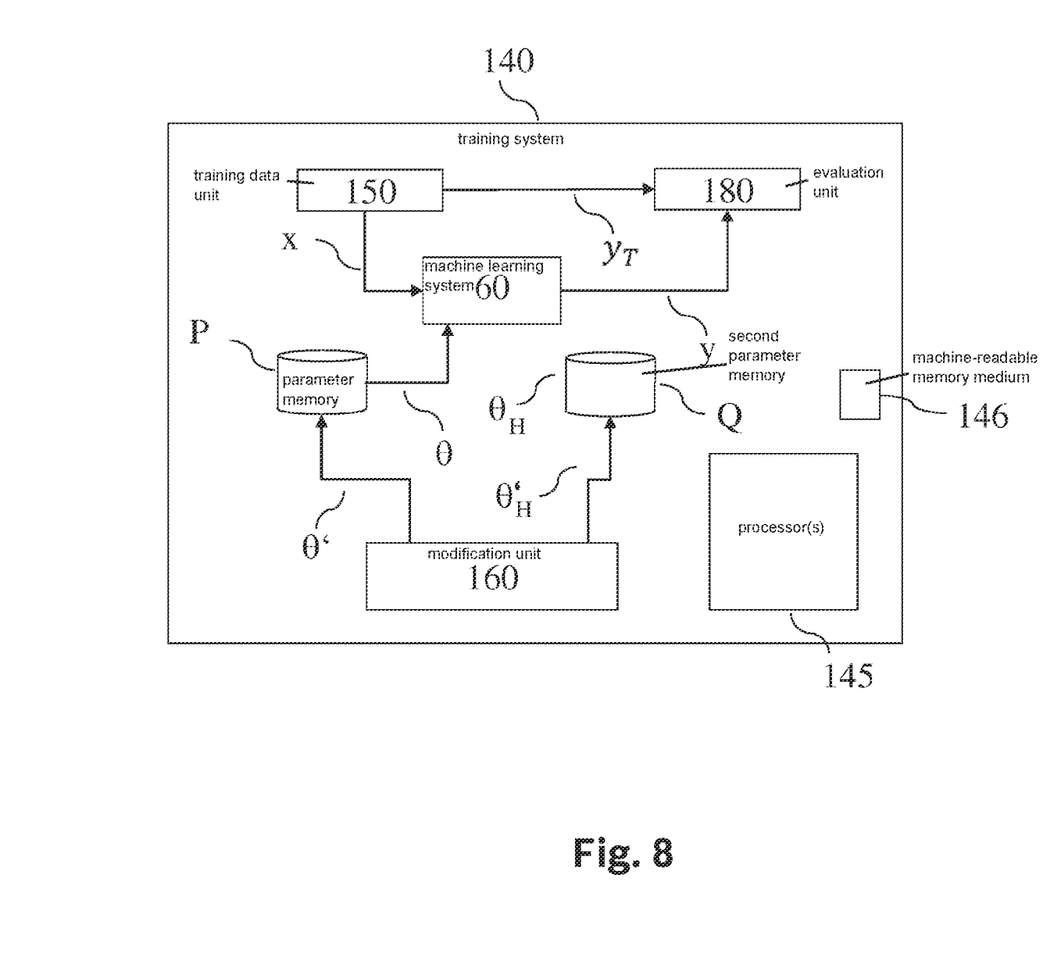
FIG. 8 schematically shows a training system, in accordance with the present invention.

FIG. 8 schematically shows one exemplary embodiment of a training system 140 for training machine learning system 60. A training data unit 150 ascertains suitable input signals x that are supplied to machine learning system 60. For example, training data unit 150 accesses a computer-implemented database in which a set of training data is stored, and selects, for example randomly, from the set of training data input signals x. Optionally, training data unit 150 also ascertains desired or "actual" output signals $y_T$ that are associated with input signals x and supplied to an evaluation unit 180.

Artificial neural network x is configured to ascertain associated output signals y from input signals x that are supplied to it. These output signals y are supplied to evaluation unit 180.

Training system 140 includes a second parameter memory Q in which hyperparameters $\theta_H$ are stored.

Figure 9:
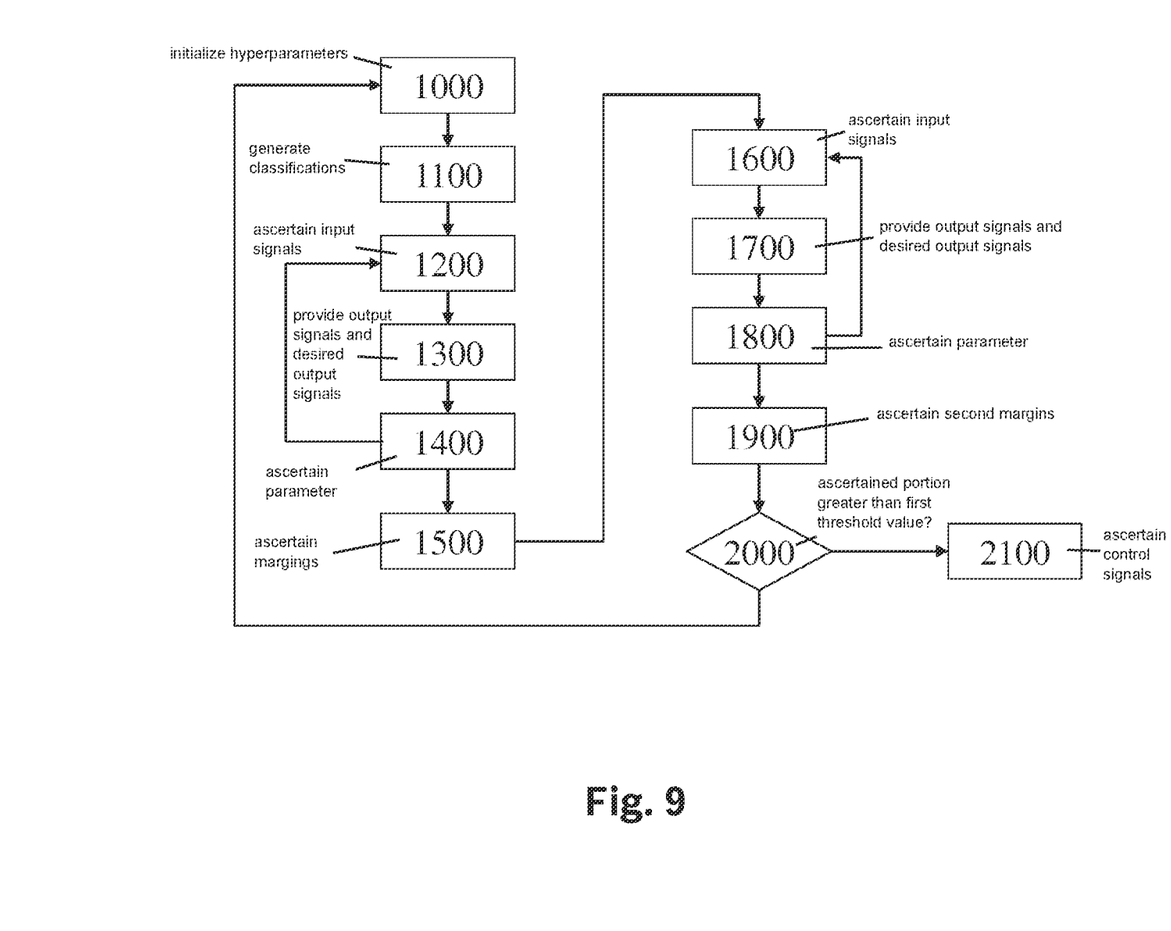
FIG. 9 shows in a flowchart one possible sequence of the method for ascertaining optimal hyperparameters, in accordance with the present invention.

A modification unit 160 ascertains, for example using the method illustrated in FIG. 9, new parameters θ' and supplies them to parameter memory P, where they replace parameters θ. Modification unit 160 ascertains, for example using the method illustrated in FIG. 9, new hyperparameters $\theta'_H$ and supplies them to second parameter memory Q.

Evaluation unit 180, for example with the aid of a cost function (English: loss function) that is a function of output signals y and desired output signals $y_T$, may ascertain parameter $\mathcal{L}$, which characterizes a performance of machine learning system 60. Parameters θ may be optimized as a function of parameter $\mathcal{L}$.

In further preferred specific embodiments, training system 140 includes one or multiple processors 145 and at least one machine-readable memory medium 146 on which instructions are stored, which when executed on processors 145 prompt control system 140 to carry out the method according to the present invention.

FIG. 9 shows in a flowchart the sequence of a method for ascertaining optimal hyperparameters $\theta_H$ according to one specific embodiment.

Initially 1000, hyperparameters $\theta_H$ are initialized, for example randomly or to fixedly predefinable values. A set of correctly labeled training data $X_C=(x_T,y_T)$ is subsequently provided by training data unit 150. Parameters θ are set to a predefinable initial value; for example, they may be set to randomly selected values.

A random permutation of the association of input signals $x_T$ and associated output signals, i.e., classifications, $y_T$ is then 1100 generated with the aid of an actual random number generator or a pseudorandom number generator. Corresponding to this random permutation, randomized classifications $\hat{y}_T$ are ascertained by permutation of classifications $y_T$, and not correctly labeled data set $X_r=(x_T,\hat{y}_T)$ is generated.

Alternatively, randomized classifications $\hat{y}_T$ may also be generated in step 1100 by random extraction from the set of possible classes with the aid of the actual random number generator or the pseudorandom number generator, and not correctly labeled data set $X_r=(x_T,\hat{y}_T)$ is thus generated.

Input signals $x=x_T$ are then 1200 ascertained from the set of correctly labeled training data $X_C$, supplied to machine learning system 60, and output signals y are ascertained from same. For this purpose, for each input signal x, the function of k-dimensional variable $f(x)$ is ascertained, and output signal y is ascertained as that component of $f(x)$ that has the maximum value.

Output signals y and actual, i.e., desired, output signals $y_T$ associated with input signals x are subsequently 1300 provided in evaluation unit 180.

Parameter $\mathcal{L}$ is subsequently 1400 ascertained as a function of ascertained output signals y and desired output signals $y_T$. New parameters θ' that optimize parameter $\mathcal{L}$ are then ascertained with the aid of an optimization method, for example a gradient descent method, by carrying out steps 1200 and 1300, in each case using new parameters θ' and optionally with multiple iterations, until optimal new parameters θ' have been ascertained. These parameters are then stored in first parameter memory P.

Lastly 1500, margins m that have resulted for optimal new parameters θ' are ascertained with the aid of ascertained k-dimensional variables $f(x)$, as well as an identification number that characterizes the statistical distribution of margins m, for example a portion of those margins m that are positive. Parameters θ are reset to a predefinable initial value; for example, they may be set to randomly selected values.

Steps 1200 through 1500 are now correspondingly repeated for not correctly labeled data set $X_r$.

For this purpose, input signals $x=x_T$ are initially 1600 ascertained from the set of not correctly labeled training data $X_r$, supplied to machine learning system 60, and output signals y are ascertained from same. For this purpose, for each input signal x, the function of k-dimensional variable $f(x)$ is ascertained, and output signal y is ascertained as that component of $f(x)$ that has the maximum value.

Output signals y and actual, i.e., desired, output signals $\hat{y}_T$ associated with output signals x are subsequently 1700 provided in evaluation unit 180.

Parameter $\mathcal{L}$ is subsequently 1800 ascertained as a function of ascertained output signals y and desired output signals $\hat{y}_T$. New parameters θ' that optimize parameter $\mathcal{L}$ are then ascertained with the aid of an optimization method, for example a gradient descent method, by carrying out steps 1600 and 1700, in each case using new parameters θ' and optionally with multiple iterations until optimal new parameters θ' have been ascertained.

Lastly 1900, second margins m' that have resulted for optimal new parameters θ' for not correctly labeled training data $X_r$ are ascertained with the aid of ascertained k-dimensional variables $f(x)$, as well as an identification number that characterizes the statistical distribution of second margins m', for example a portion of those second margins m' that are positive.

A check is now made 2000 as to whether the ascertained portion is greater than a first threshold value and whether the ascertained second portion is less than a second threshold value. If this is not the case, hyperparameters $\theta_H$ are varied, for example randomly, on a predefinable discrete grid, and the method branches back to step 1000 and is carried out anew using varied hyperparameters $\theta_H$ (of course, hyperparameters $\theta_H$ are not reinitialized in step 1000). If all possible values of hyperparameters $\theta_H$ have been explored, the method terminates with an error message.

In contrast, if the ascertained portion is greater than a first threshold value and the ascertained second portion is less than a second threshold value, the instantaneous values of hyperparameters $\theta_H$ are stored in second parameter memory Q. The method thus ends.

As an alternative to successively varying and evaluating hyperparameters $\theta_H$, it is also possible to initially ascertain in each case the portion and the second portion for all possible values of hyperparameters $\theta_H$ on a predefinable discrete grid, and from all possible values of hyperparameter $\theta_H$ to select that value that is best met, for example Pareto-optimally, for the condition that the ascertained portion is greater than a first threshold value and the ascertained second portion is less than a second threshold value.

Figure 10:
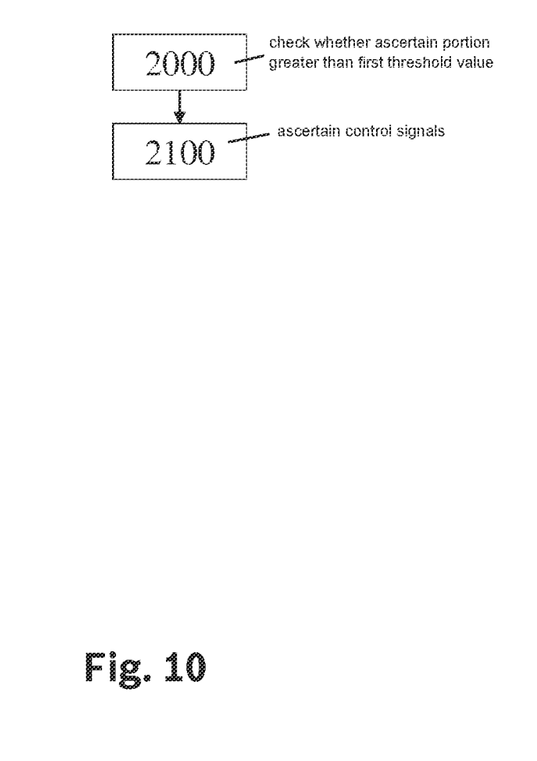
FIG. 10 shows in a flowchart one possible sequence for operating the machine learning system, in accordance with the present invention.

FIG. 10 shows the sequence of the method for operating machine learning system 60. Machine learning system 60 receives 2000 input data x and ascertains output data y with the aid of a function $f$ that is parameterized by parameters $\theta$. Control signals A may be ascertained 2100 as a function of output data y. The method thus ends.

It is understood that the methods may possibly not be implemented completely in software as described. They may also be implemented in hardware, or in a mixed form of software and hardware.

What is claimed is:

1. A method for computer-assisted parameterization of a machine learning system configured to ascertain as an output signal a class from a plurality of classes based on an input signal, the method comprising the following steps:
   training the machine learning system once with correctly labeled training data, and once with not correctly labeled training data; and
   selecting hyperparameters of the machine learning system in such a way that the trained machine learning system reproduces actual classifications of the correctly labeled training data better than actual classifications of the not correctly labeled training data,
   wherein the hyperparameters are selected in such a way that for the trained machine learning system, a statistical frequency distribution of margins that result when the machine learning system is supplied with the not correctly labeled training data has two maxima as a function of the margins.

2. The method as recited in claim 1, wherein the machine learning system is a neural network.

3. The method as recited in claim 1, wherein the actual classifications of the not correctly labeled training data are a permutation of the actual classifications of the correctly labeled training data.

4. The method as recited in claim 3, wherein the not correctly labeled training data are ascertained from the correctly labeled training data by a random permutation of the actual classifications.

5. The method as recited in claim 1, wherein the hyperparameters are selected in such a way that a portion of the actual classifications of the correctly labeled training data that are correctly reproduced by the trained machine learning system is greater than a portion of the actual classifications of the not correctly labeled training data that are correctly reproduced by the trained machine learning system.

6. The method as recited in claim 5, wherein the hyperparameters are selected in such a way that the portion of the actual classifications of the correctly labeled training data that are correctly reproduced by the trained machine learning system is greater than a first predefinable threshold value, and/or the portion of the actual classifications of the not correctly labeled training data that are correctly reproduced by the trained machine learning system is less than a second predefinable threshold value.

7. The method as recited in claim 1, wherein the hyperparameters are selected in such a way that for the trained machine learning system, a statistical frequency distribution of margins that result when the machine learning system is supplied with unlabeled training data has only one maximum as a function of the margins, the maximum being assumed for a value of the margins that is greater than zero.

8. A training system for computer-assisted parameterization of a machine learning system configured to ascertain as an output signal a class from a plurality of classes based on an input signal, the training system configured to:
   train the machine learning system once with correctly labeled training data, and once with not correctly labeled training data; and
   select hyperparameters of the machine learning system in such a way that the trained machine learning system reproduces actual classifications of the correctly labeled training data better than actual classifications of the not correctly labeled training data,
   wherein the hyperparameters are selected in such a way that for the trained machine learning system, a statistical frequency distribution of margins that result when the machine learning system is supplied with the not correctly labeled training data has two maxima as a function of the margins.

9. A method for operating a control system including a machine learning system that has been trained to ascertain as an output signal a class from a plurality of classes based on an input signal, by training the machine learning system once with correctly labeled training data, and once with not correctly labeled training data, and selecting hyperparameters of the machine learning system in such a way that the trained machine learning system reproduces actual classifications of the correctly labeled training data better than actual classifications of the not correctly labeled training data, wherein the hyperparameters are selected in such a way that for the trained machine learning system, a statistical frequency distribution of margins that result when the machine learning system is supplied with the not correctly labeled training data has two maxima as a function of the margins, the method comprising:
   ascertaining a control signal as a function of an output signal that is ascertained using the machine learning system.

10. The method as recited in claim 9, wherein an at least semi-autonomous robot and/or a manufacturing system and/or a personal assistant and/or an access system and/or a monitoring system or a medical imaging system, is controlled as a function of the ascertained control signal.

11. A control system, comprising:
   one or multiple processors; and
   at least one machine-readable memory medium on which instructions are stored, which when executed on the processors prompt the control system to ascertain a control signal as a function of an output signal that is ascertained using an machine learning system, the machine learning system having been trained to ascertain as an output signal a class from a plurality of classes based on an input signal, by training the machine learning system once with correctly labeled training data, and once with not correctly labeled training data, and selecting hyperparameters of the machine learning system in such a way that the trained machine learning system reproduces actual classifications of the correctly labeled training data better than actual classifications of the not correctly labeled training data, wherein the hyperparameters are selected in such a way that for the trained machine learning system, a statistical frequency distribution of margins that result when the machine learning system is supplied with the not correctly labeled training data has two maxima as a function of the margins.

12. A method for operating a control system, the control system including a machine learning system configured to ascertain as an output signal a class from a plurality of classes based on an input signal, the method comprising the following steps:
training the machine learning system once with correctly labeled training data, and once with not correctly labeled training data;
selecting hyperparameters of the machine learning system in such a way that the trained machine learning system reproduces actual classifications of the correctly labeled training data better than actual classifications of the not correctly labeled training data, wherein the hyperparameters are selected in such a way that for the trained machine learning system, a statistical frequency distribution of margins that result when the machine learning system is supplied with the not correctly labeled training data has two maxima as a function of the margins; and
ascertaining a control signal as a function of an output signal that is ascertained using the machine learning system.

13. A machine learning system whose hyperparameters are selected in such a way that the machine learning system is trained to reproduce actual classifications of correctly labeled training data better than actual classifications of not correctly labeled training data, wherein the hyperparameters are selected in such a way that for the trained machine learning system, a statistical frequency distribution of margins that result when the machine learning system is supplied with the not correctly labeled training data has two maxima as a function of the margins.

14. A non-transitory machine-readable memory medium on which is stored a computer program for computer-assisted parameterization of a machine learning system configured to ascertain as an output signal a class from a plurality of classes based on an input signal, the computer program, when executed by one or more processors, causing the one or more processors to perform:
training the machine learning system once with correctly labeled training data, and once with not correctly labeled training data; and
selecting hyperparameters of the machine learning system in such a way that the trained machine learning system reproduces actual classifications of the correctly labeled training data better than actual classifications of the not correctly labeled training data,
wherein the hyperparameters are selected in such a way that for the trained machine learning system, a statistical frequency distribution of margins that result when the machine learning system is supplied with the not correctly labeled training data has two maxima as a function of the margins.

* * * * *